US 6,546,314 B1

(12) United States Patent
Carr et al.

(10) Patent No.: US 6,546,314 B1
(45) Date of Patent: Apr. 8, 2003

(54) POLLING REMOTE FUELING SITES FOR PRODUCT LEVEL FOR SIR ANALYSIS THROUGH THE INTERNET

(75) Inventors: Fred K. Carr, Chapel Hill, NC (US); Walter E. Warn, Knightdale, NC (US)

(73) Assignee: Progressive Int'l Electronics, Raleigh, NC (US)

( * ) Notice: Subject to any disclaimer, the term of this patent is extended or adjusted under 35 U.S.C. 154(b) by 0 days.

(21) Appl. No.: 09/630,305

(22) Filed: Jul. 31, 2000

(51) Int. Cl.[7] .............................................. G06F 17/00
(52) U.S. Cl. ...................... 700/244; 700/236; 700/241
(58) Field of Search ................................. 700/231, 236, 700/239, 241, 244; 235/375, 381; 222/52

(56) References Cited

U.S. PATENT DOCUMENTS

| | | | |
|---|---|---|---|
| 5,270,943 A | * | 12/1993 | Warn |
| 5,400,253 A | * | 3/1995 | O'Connor .................. 700/236 |
| 5,423,457 A | * | 6/1995 | Nicholas et al. .............. 141/83 |
| 5,557,529 A | * | 9/1996 | Warn et al. ................. 235/380 |
| 5,694,326 A | * | 12/1997 | Warn et al. ................. 700/231 |
| 5,889,676 A | * | 3/1999 | Kubo et al. ................. 700/231 |
| 6,176,421 B1 | * | 1/2001 | Royal et al. ................. 235/381 |
| 6,351,689 B1 | * | 2/2002 | Carr et al. .................. 700/236 |

* cited by examiner

Primary Examiner—Khoi H. Tran
(74) Attorney, Agent, or Firm—Fred K Carr

(57) ABSTRACT

The present invention relates to a method for gathering product level profile information from different, spaced apart fueling locations networked together to a server through the Internet. A RLM monitors the data wire between the dispensers and dispenser controller to determine the amount of fuel dispensed and it stores this information in memory. The RLM is further interfaced to the ATG to determine the amount of product remaining in the USTs, and it tracts fuel additions to the USTs from delivery trucks. This information is stored in a data file in the RLM, and is linked together along with a site identifier to form a data packet for transmission. A communication network interconnects the RLMs of the remote fueling sites to a server. The server maintains a first database of routing numbers for the remote sites, and a second database of product level information for each remote site. The server individually polls the remote sites to obtain the data packet. Configurators may be used to configure the digital data in the data stream into logic signals such that the MP in the RLM can read data for different dispenser brands, therefore different dispenser brands can be used in the information network.

24 Claims, 4 Drawing Sheets

POLLING REMOTE FUELING SITES FOR PRODUCT LEVEL FOR SIR ANALYSIS THROUGH THE INTERNET

FIELD OF THE INVENTION

The present invention relates to a device and method for gathering information, and more particularly, gathering information over the Internet on fuel product levels from a data line monitor located at remote, spaced apart fueling locations networked together to a server.

BACKGROUND OF THE INVENTION

The traveling public often pump motor fuel into their own vehicles at self serve fueling sites and convenience stores. There are now over one hundred fifty thousand self serve fueling sites in the US, Americans pump fuel into the fuel tank of their cars over seventeen billion times a year. The Environmental Protect Agency (EPA) requires that all underground storage tanks (UST) and aboveground storage tanks (AST) at these fueling sites be monitored for small leaks. Through the years EPA has allowed several monthly monitoring options including: automatic tank gauging, ground water monitoring, tank interstitial wall monitoring, vapor monitoring, and statistical inventory reconciliation (SIR) of data from the fueling sites. The present disclosure relates to a method for gathering information from these remote sites over the Internet, namely, gathering fuel sales, fuel deliveries, and fuel tank levels for SIR analysis.

There are several commercial brands of fuel dispensers used in the retail petroleum industry to dispense fuel to the public. Dispensers are manufactured by different manufacturers including Gilbarco, Tokheim, Wayne Dresser, and others. The present invention discloses a method for gathering information from different dispenser brands which are often used within the fueling network of the present disclosure. USTs provide fuel to the dispensers, and they typically hold a maximum volume of 10,000 gallons. Three product grades are usually offered, therefore, three tanks are on site unless blend dispensers are used in which case there would be two tanks.

Fuel dispensers at self service fueling sites are typically controlled by a dispenser controller located in a building at the site so that the site attendant can monitor and control the dispensing process. The dispenser controller is generally a microprocessor (MP) based system with read-only-memory (ROM) and read-and-write-memory (RAM) for writing, reading, and storing information. The controller sends data signals (commands) to the dispensers including price to charge for the fuel dispensed, preset amounts of fuel to dispense, and pump authorization to dispense fuel. The dispensers likewise send data signals (responses) to the controller including pump number, pump status, and dispensed fuel volume and value. The personal computer (PC) is particularly well suited for use as a dispenser controller since it can simultaneously perform other functions including cash register, scanning, wet and dry stock inventory, accounting, payroll, and other modules. These systems are generally referred to as Point-of-Sales (POS) systems. Typically, there is a fuel pump control center between the POS and the dispensers which allows the POS to communicate with the dispensers. U.S. Pat. Nos. 5,694,326, 5,557,529, and 5,270,943, having common inventors and assignee, relate to fuel pump centers for controlling dispensers through the POS system.

The present invention monitors the data line between the POS and the dispensers to collect information on the amount of fuel dispensed from each dispenser. U.S. Pat. No. 5,361,216, having common inventors and assignee as the present disclosure, relates to a flow signal monitoring system for monitoring the data signals in a data wire between the fuel dispensers and the dispenser controller. Flow quantity signals are collected, stored, and later down-loaded to other devices. The system includes an electronic communication translator which is attached to the data wire. The system is designed such that it is coupled to the data wire, however it is electrically isolated from the data wire. The system uses a configuration circuit to convert the signals into corresponding computer logic signal. This allows the system to work with different brands of dispensers and transparent to the POS. The computer logic signals are sent to a microprocessor with ROM and RAM for processing. The system also includes a data field selector which instructs the MP to select and process data fields relating to flow quantity, and to discard all other data signals. Information on the amount of fuel dispensed at each fueling position in the dispensers is stored in memory and later down-loaded to other devices. The system is referred to in the industry as a remote line monitor (RLM).

In the present disclosure, the RLM further includes a serial interface to an ATG for collecting information on product level in the USTs and ASTs at the fueling site, ATGs are widely used at public fueling sites. The system collects information on fuel sales, fuel deliveries, and existing fuel tank inventory, and transmits this information via the Internet to a server which is networked to the RLM through a communication system. In general, the present disclosure combines the RLM with the Internet to form an information gathering system for collecting product profile levels including fuel dispensed for each hose at each fueling position for each dispenser. This information is obtained by monitoring the data line between the dispensers and the POS. The RLM is further serially interfaced to an ATG for determining the amount of existing inventory in each tank. The RLM accumulates this information into a data file which is later transferred over the Internet as a data packet.

U.S. Pat. No. 5,423,457, issued to Michael Nicholas et al., discloses a system for detecting product lost which uses a site controller to perform SIR analysis on inventory data on site. U.S. Pat. No. 5,400,253, issued to Paul O'Conner, discloses an on-site computer system which constantly collects and analyses data through a SIR formula. U.S. Pat. No. 5,757,664, issued to Warren Rogers et al., discloses a system for assessing the operational performance of a fluid storage and dispensing system by measuring and analyzing volumes associated with the system. These references, however, do not disclose all of the elements as disclosed and used in combination in the present disclosure, in particular, the RLM. The present disclosure combines the line monitoring technology disclosed in U.S. Pat. No. 5,361,216 with an off-site server through the Internet for the purpose of gathering dispenser and UST product level information through a remote RLM located at remote fueling sites.

SUMMARY OF THE INVENTION

In summary, the present invention provides a method for gathering product level profile information from a RLM located at different, spaced apart fueling locations networked together to a server through the Internet. The RLM monitors the data line between the dispensers and the POS to determine the amount of fuel dispensed; it is further interfaced to the ATG to determine the amount of product remaining in the USTs, and it tracts fuel additions to the USTs from delivery trucks. This information is stored in a data file in the RLM, and is later linked together along with a site identifier to form a data packet for transmission. A communication network interconnects the RLM of the remote fueling sites with a server. The server maintains a searchable-selectable database of routing numbers for the remote sites, and a database of product level information for each remote site. The server polls individually the remote sites to obtain the data packets. The data packet is in digital form if delivery is over the Internet, and it may be further be encoded for protection. Configurators may further be used in the RLM to configure the data signals from the dispenser to the controller into signals which are readable by the RLM so that different dispenser brands can be used in the network.

When a customer pulls his vehicle up to a dispenser for fuel, he selects the grade of fuel he wishes to put in his vehicle, for example, low, mid, high grades are most often offered. This information along with the method of payment for the fuel is sent to the POS and the dispenser is authorized to dispense fuel. As fuel is dispensed, the dispenser sends information to the POS on each product grade dispensed by fueling position and hose number. A fueling position is one side of a dispenser and the hose number identifies the product grade. After the sale is complete, the dispenser sends to the POS final sale information including fueling position, hose number, type sale, dollar amount, and volume amount. This information is stored and sorted in data files by the RLM for later down-load.

The RLM at the remote fueling sites are further electrically interfaced to the ATGs through a serial interface. ATGs are widely used in the retail petroleum industry, and include a probe which is positioned in USTs for measuring the amount of water in the tank, the amount of product in the tank, and product temperature. The configuration of the interface between the RLM and the ATG depends on the manufacturer of the probe, but generally involves a serial hardware communication device. An ATG interface module in the RLM programming provides the conduit for the transfer of UST product inventory levels from the ATG to the RLM.

The USTs provide feed stock to the dispensers as product is dispensed. The USTs are usually 10,000 gallon tanks which are replenished with product by delivery trucks. The ATG formulates a "delivery report" from probe information, and the driver also reports to the store manager information on the delivery. The later could be manually input into the RLM, or for that matter another device for transfer to the server. A data accumulation module in the RLM programming links the above discussed UST inventory data with the fuel dispensed data and fuel added data to form a data packet for transfer to the server.

A negative balance between the amount delivered, the tank inventory, and the amount dispensed are evidence of a small tank leak. However, several other factors can caused negative balances when calculating inventory data including: faulty dispenser calibration, faulty ATG controller, and improper placement of the probe in the UST. These factors can also cause a positive balance. False alarms are quite common in monitoring for small leaks. For stand alone devices, EPA standards for a system are detecting a leak of 0.2 gallon per hour with a probability of detection at least 0.95 and a probability of false detection no greater than 0.05.

In its simplest form, the server in the present disclosure would maintain a database of routing numbers for the remote fueling sites and a database for up-dating product level profile information from the remote sites. In a preferred embodiment the server transmits the gathered information to a SIR facility for analysis. Several companies in the US, including Simmons Corp in Texas and Warren Rogers Associates in Road Island, have been established for the purpose of preforming SIR analysis on product level information. Large computers at these facilities systematically analyze trends for tank inventory for various data points. In an alternate embodiment the server would include the programming for the SIR analysis.

Accordingly, the primary object of this invention is to provide a method for gathering product level profile information from remote fueling sites.

A further object of the present invention is to provide a method whereby product level information at the remote sites is collected, sorted and stored by a remote line monitoring device.

A further object of the present invention is to provide a method for gathering product level profile information from remote fueling sites using dispensers within the communication network which are manufactured by different manufacturers.

A further object of the present disclosure is to provide a method for gathering product level information where the information is transmitted as data packets.

A further object of the present invention is to provide a method for gathering product level information where the data packets are transmitted over the Internet, a cable system, or a satellite based communication system network.

BRIEF DESCRIPTION OF THE DRAWINGS

Other objects of this invention will appear in the following specification and claims, reference is made to the accompanying drawings which form a part thereof.

DETAILED DESCRIPTION OF THE INVENTION

In general, the present invention includes a server-based computer system which polls, stores and sorts databases of product level information from remote fueling sites. The server is networked to a plurality of remote, spaced apart fuel dispensing facilities, and it collects information and maintains dossiers of product amounts at each dispensing facility. The server is networked to a data line monitoring system (RLM) located at each site through the Internet, and it collects information on fuel dispensed, fuel delivered, and existing tank inventory levels. At request, a data packet is generated by the RLM by linking the site identifier, flags, the fueling position, the hose number, volume, credit, and cash totals, delivery data, and ATG information into a single data stream, referred to as a data packet. The data packets are transmitted in message queues over the Internet to the server as a single, inseparable data stream.

Figure 1:
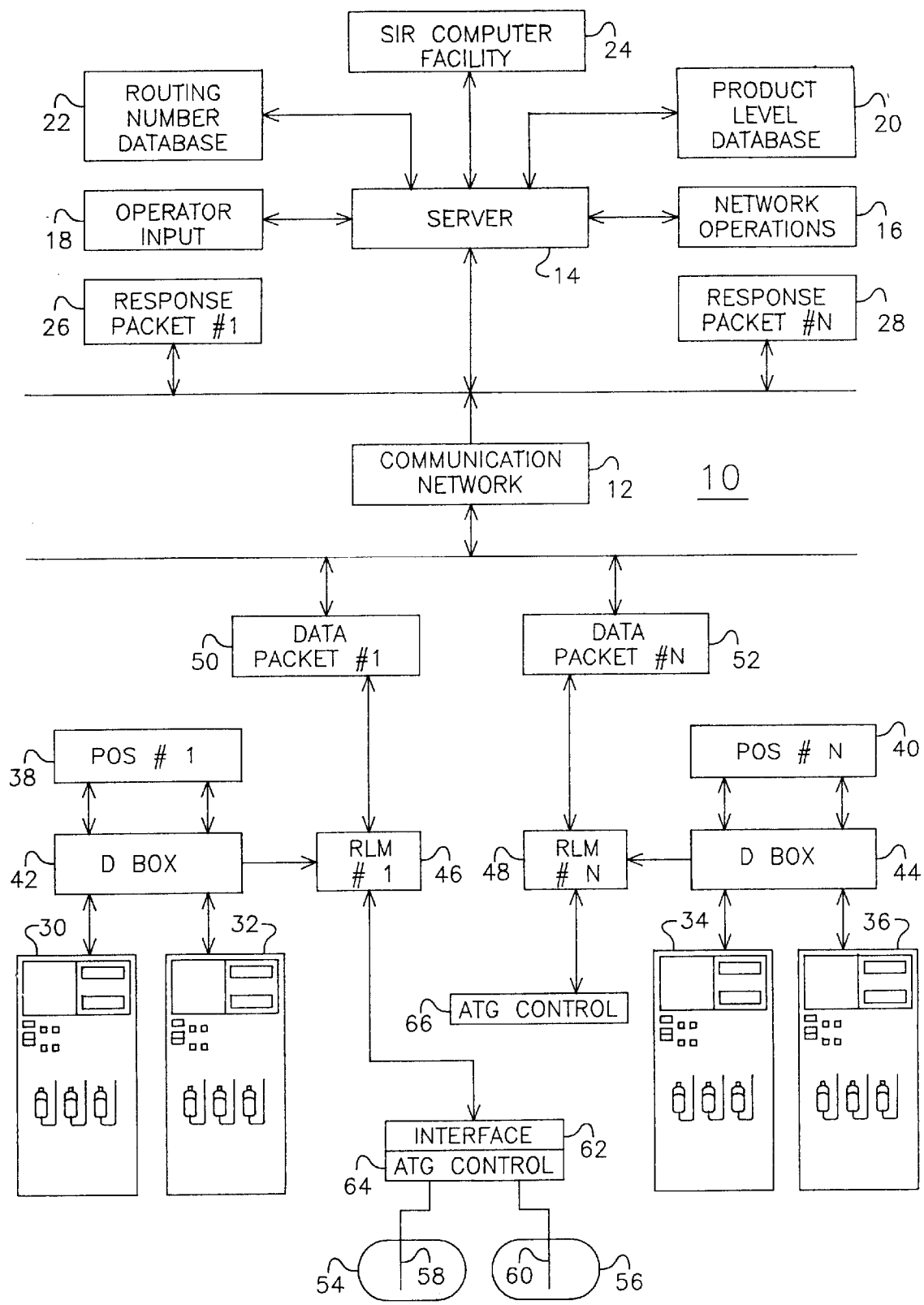
FIG. 1 is a block diagram of the hardware components of the present invention for gathering product level information from remote fueling sites through a RLM.

Referring now to the drawings, and first to FIG. 1, there is shown a block diagram of the hardware arrangement for the present invention, generally designated (10). The fuel dispensers (30,32,34,36) are operationally connected to a server (14) through a communication network (12). Dispensers (30,32) are individually connected to POS (38), and dispensers (34,36) are individually connected to POS (40). RLM (46) monitors the communication line between dispensers (30,32) and POS (38), and RLM (48) monitors the communication line between dispensers (34,36) and POS (40). RLMs (46,48) connect into the data line at D-boxes (42,44) as discussed in FIG. 2. The RLMs (46,48) are connected to the server (14) through communication network (12). In the drawings, each dispenser-RLM combination represents a remote, spaced apart fueling facility, each having a common connection to the server (14) through communication network (12). In practice, the number of fueling sites in the network can vary from a few up to thousands, depending on the capability of the server (14).

Further in the illustration, the POSs (38,40) are shown as being connected to two dispensers each, however in actual practice, there are typically several dispensers at the fueling site connected to the POS (38,44). In a rural area the number of dispensers at the site may be two, at a truck stop the number may be thirty or more. The dispensers may be single product or multiple product, usually they dispense regular, mid, and premium grades. In a preferred embodiment, the communication network (12) is the Internet. Since the Internet uses phone lines for part of its communication pathway, each fueling site can be identified by an electronic address (routing number), referred to as the RLM or location identifier in the present disclosure. The network connection can be continuous or intermittent on demand. As later discussed, the RLM tags individual fueling positions (a side of a dispenser) and also tags the hose number (product type) at the site. Therefore, specific information can be gathered and stored by the server on a particular hose number at a particular fueling position at a particular fueling site.

The RLMs (46,48) are also electrically connected to the ATG systems (64,66). ATG (64) includes probes (58,60) located in the USTs (54,56). A serial interface (62) provides the connection between the RLM (62) and ATG (64). (Tanks with probes are not shown for ATG (66) due to space considerations.) ATGs are widely used in the industry to monitor product level and volume in USTs and generally include a probe mounted in a UST with electronic connection to a central control device which, in the present disclosure, has a serial interface (62) to the RLM (46). Probes use several methods to determine product level depending on the system manufacturer. They most often measure the amount of product, the amount of water, and the temperature of the product in the tank, factors which are used in calculating product volume. The nature of the communication between the probe and the RLM varies depending on the type probe being used, but generally is a serial hardware communication device. While not shown in the illustration, there are also pipe connections between the dispensers and the USTs so that the tanks can provide feed stock to the dispensers as fuel is dispensed.

The ATGs measure the inventory level of product in the USTs. In the illustration two tanks are shown for each site. There may be three tanks at the site depending on the type dispenser being used. Blend dispensers use two tanks where mid-grade is a blend of regular and premium feed stock. Since each UST can feed several fueling positions with a product grade, each fueling location in the network site has a unique tank map specific to that site. This information is stored in memory of the server (14) so that each hose at each fueling position can be properly assigned to a specific UST.

As more fully discussed later, the RLMs (46,48) link certain data fields to form data packets (50,52). At request, these are transmitted over the communication network (12) to the server (14). The data packets generally include site identifier, flags, fueling position, hose number, ATG product level information (inches of product), and fuel delivery data. The data packets are transmitted in message queues as inseparable data stream.

Server (14) is connected through a communication network (12) to remote, spaced apart fueling locations through RLM (46,48) located at individual sites. The server (14) may be any type computer, for example, a stand-alone microprocessor, a server based system of PC's, or a mainframe. The server has the usual compliment of operator input interfaces (18) for inputting data, a network operators interface (16) for operations control, memory storage devices, and other I/O devices. The above constitutes a server means. Since such systems are widely used in the communication industry, they are not discussed in greater detail here. Of importance to the present disclosure is that the server (14) maintains data files of product inventory at a number of remote fueling sites, where information collected from the remote sites include product sales, product deliveries, and existing levels of product in USTs.

The server (14) maintains a routing number database (22) which contains site identifiers (routing numbers) of remote sites in the network, and a product level database (20) which stores and sorts information being transmitted in the data packets (50,52). These databases are searchable-selectable. The server (14) can be programmed to poll the remote fueling facilities as desired, but usually once per day. The server (14) also has a SIR computer facility interface (24) which allows the server to communicate with the facility for the transfer of information. In a preferred embodiment, the actual SIR analysis is done at a computing facility designed for this function.

The server (14) may at times need to respond back to the remote sites with certain information such as inventory flags. This is accomplished through response packets (26, 28). The response packets (26,28) are data streams created individually by the server (14) in response to particular information sorted from the product level database (20). Response packets (26,28) include site location information along with any information specific for the site. When the Internet is used as the communication network, the data is in digital form and may be encoded for protection.

Fuel dispensers are manufactured by several manufacturers including Gilbarco, Tokheim, Wayne Dresser, and others which are widely used in the retail petroleum industry. With the present invention, there may be from a few to thousands of fueling sites, or remote RLM locations, in the communication network. It is therefore likely that different dispenser brands are present in the network. It would be advantage to be able to collect information from different dispenser brands in the network, although this is not a restriction to the present disclosure. As discussed below, configurator circuits in the RLM (46,48) allow different dispenser brands to be used in the network.

Figure 2:
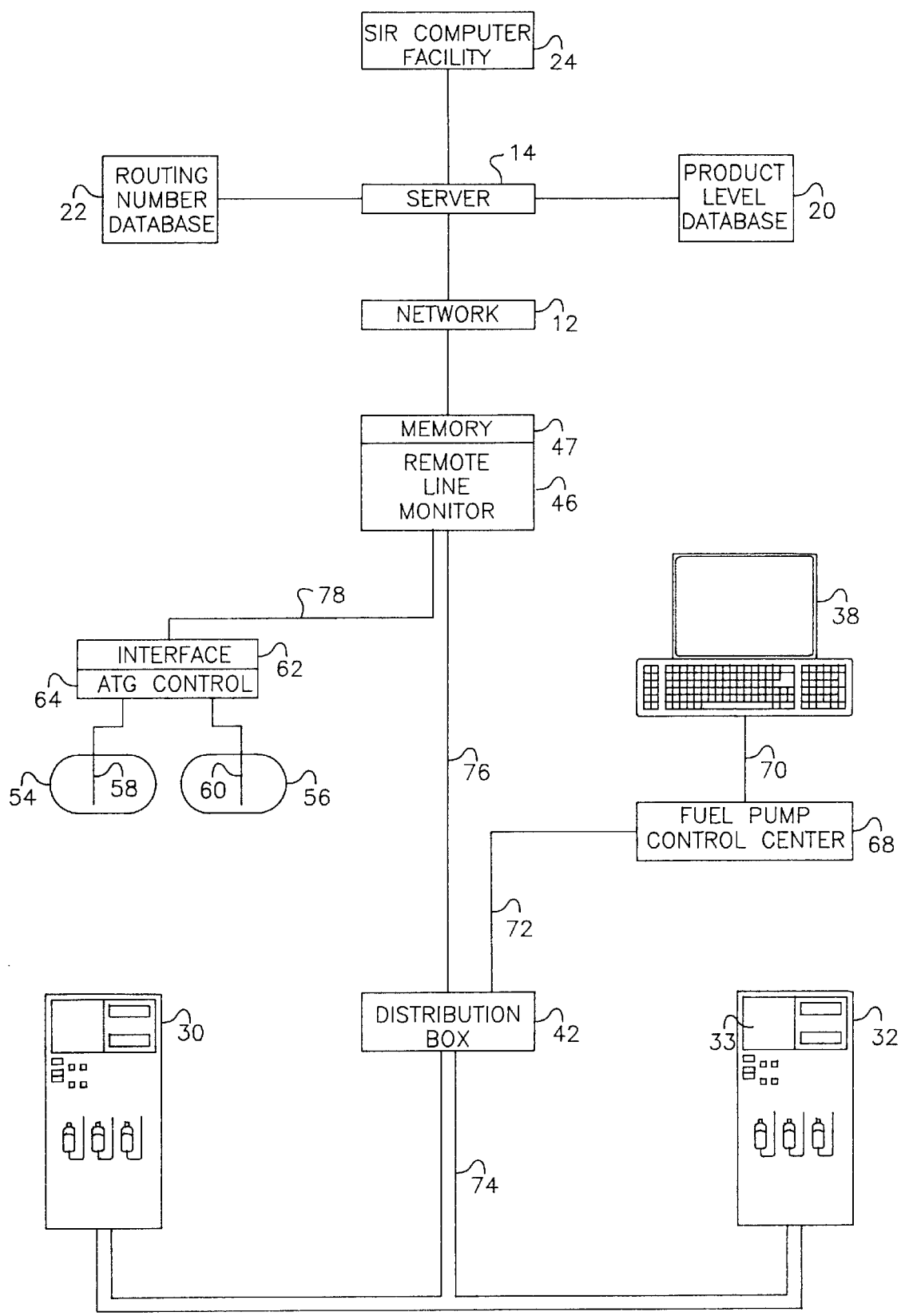
FIG. 2 is a schematic block diagram of a fuel dispensing site connected to the server showing the dispensers under the control of a POS being monitored by a RLM.

Referring now to FIG. 2, there is shown a schematic overview of a fuel dispensing system which represents an individual fueling site in the communication network (10). The system includes fuel dispensers (30,32) operationally connected to a server (14) through communication network (12). The dispensers (30,32) are connected to a POS system (38) through the fuel pump control center (68) which allows the POS computer (38) to monitor and control the dispensing process at the dispensers (30,32). The fuel pump control center (68) is serially connected to the POS (38) through serial cable (70). Through the control center (68), the POS sends data signal commands to the dispenser (30,32), receives data signal responses from the dispensers, and it can also send display data to the display unit (33). The fuel pump control center (68) is connected to distribution box (42) through cable (72). The distribution box (42) provides a common wiring connection for the dispensers in the site communication loop, and in the present illustration is connected to the dispensers (30,32) through wiring (74).

The fuel pump control center (68) is an interface between the POS (38) and the dispenser (30,32). The control center (68) sends data signals commands to the dispensers (30,32) for controlling the dispensing process, and the dispenser (30,32) sends data signal responses to the control center (68). The information send to the dispensers (30,32) includes price per gallon to be charged for the fuel at corresponding pumps, preset amounts of fuel to be dispensed, and pump authorization. Simultaneously, signals are generated at the dispenser (30,32) for presentation to the control center (68) including pump number, pump status, and dispensed fuel volume and valve for the pump. As more fully developed below, the RLM (46) monitors this pump. As more fully developed below, the RLM (46) monitors this data line to obtain fuel dispensed information by fueling position and hose number which is stored in memory (47).

Dispenser manufacturers use different wiring arrangements and a proprietary communication protocol for communication between their dispensers and controller. Current loop and voltage level are communication formats commonly used in the industry for pump control. The communication format used in the illustrative example is current loop. A feature of the present disclosure is that it can through configuration circuits configure the different communication protocol used by different dispenser brands into a readable logic so that different dispenser brands can be used in the server network. Newer dispenser models are designed to operate on local area networks (LAN) where the LAN may include in addition to the dispensers the POS, card readers, Internet connection, outside lighting, and related. In general, the LAN uses, for example, TCP/IP protocol to carry the other protocols including the dispenser protocol. In such systems, the RLM would be connected into the LAN, and would obtain fuel dispensed information from the network. The information would be processed and stored for later down-load to the server (14). The above constitutes a dispensing means, which are widely used in the retail petroleum industry.

The use of POS systems to control fuel dispensers is widely used in the industry. These systems generally utilize an open architectural hardware platform which includes a PC with multi-tasking operating system and POS application software programming with modules to integrate task including cash register, dispenser control, credit card processing, and scanning. Data exchange between a computer, i.e. POS (38), and a peripheral device can be in a serial format using standard interfaces including RS-232, 422, and 485 format. In addition, computers typically include an expansion bus and card connectors allowing peripheral device to directly interface with the computer utilizing direct memory access. The control center (68) operates like any other peripheral device to the POS computer (38) with an external version having serial connection and an internal version with bus connection. Commands can be issued and data read using conventional operating systems including DOS, Windows, UNIX, and others. The above constitutes a POS means, which are widely used in the industry.

Reference is now made to U.S. Pat. No. 5,694,326, which is incorporated as an essential reference, having common inventors and assignee. Generally, there are a number of pump commands/responses being transmitted between the POS (38) and the dispensers (30,32) through the control center (68). The reference discusses configurators which allows the same POS application software to control different dispenser brands. Generally the following commands-responses are transmitted including authorize, sale information, stop, resume, error, status request, reset, blend, polled totals, PPU, and code download.

The RLMs (46,48) monitor the above discussed data stream to obtain information on fuel dispensed by fueling position and hose number. Reference is made to U.S. Pat. No. 5,361,216, having common inventors and assignee, which is incorporated as a reference. The patent discloses a MP-based flow signal monitoring system for monitoring the digital data stream in the data wire between dispensers and dispenser controller. The data stream contains several data fields, as discussed above, including fuel dispensed from each fueling position by hose number. An electronics communication translator (i.e. a configurator), is connected to the data wire to convert the data stream into a computer logic readable by a MP which has corresponding information on each data field. The configurator allows one to obtain information from various dispenser brands in the network. This information is fed to a MP which is also connected to a programmable data field selector which instructs the MP as to which data feilds to process and which to discard. It selects data field on fuel dispensed, and discards all others. A memory device stores updated information on fuel dispensed by fueling position, hose number; this information is later down load to other devices.

In the present disclosure, the RLM is further interfaced to the ATG at the site. As previously discussed, ATGs are widely used in the retail petroleum industry to monitor product level and volume in USTs and ASTs. These systems generally include a probes (58,60) mounted in an USTs (54,56) with an electronic connection to a central control device (64). In the present disclosure, a serial interface (62) connects the ATG to the RLM (46) through cable (78). The above constitutes a measuring means. ATG probes use several methods to determine product level depending on the manufacturer. An example of a commonly used probe includes a magnetic strip with a float which sits at the product/water interface level and a second probe which floats on the top of the fuel. ATGs generally measure the water level, the product level, and the temperature of the product, factors which are used to calculated product volume. The present invention uses product level in inches as its data unit.

The nature of the communication interface (62) between the probe (58,60) and the RLM (46) varies depending on the type AGT being interface to. However, it generally involves a serial communication format, and the following information is transferred: date, time, tank number, flags, product level, product temperature, and water level. The data is contained in a single data stream. The following steps are generally followed for polling the ATG: establish communication with ATG, send control character, receive data string, decode data string into product level, terminate communication. The RLM (46) has software routines for collecting, sorting, and storing this information in memory (47).

The USTs at fueling sites are typically 10,000 gallon tanks which provide feed stock to the dispensers. As product is used up, it is replenished by transport trucks which add product to the tanks. Typically, the driver will "stick" the tank before he adds product, add product, and then "re-stick" the tank after the product has been added. The number of gallons added to each tank, along with stick information is given to the site manager by the driver. This information can be manually entered into the system including: date, time, tank number, number gallons added. This constitutes an input means. The ATG also formulates a "Delivery Report" which includes the following information: date, time, tank number, number gallons added, and product temperature. This information is transmitted from the ATG (64) to the RLM (46) for storage.

The preferred communication network (12) is the Internet for transmitting the data and response packets to and from the remote fueling locations. In alternate embodiments, the communication network systems are cable-based systems and satellite-based communication systems. When the Internet is used, the data is in digital form, and it may be encoded to prevent unauthorized duplication. When other communication systems are used, the data is transmitted in digital form when the system permits. The above constitute a network means, which are widely used for other applications.

The server (14) maintains a routing number database (22) and a product level database (20). The routing number database (22) contains the electronic address of the remote POS locations in the network, and is used to poll the remote locations. The number and time of the poll is determined by programming in the server (14). The product level database (20) contains up-dated information from the data packets (50,52) transmitted from the remote sites. The files in the product level database (20), essentially electronic dossiers of product level at individual sites, are up-dated with each poll.

A data accumulation module in the RLM software accumulates data from monitoring the data line (dispensed fuel module), the ATG interface module, and the delivery report module, and stores it in a Tank.Data.File. Data packets (50,52) are generated from the Tank.Data.Files for transfer to the product level database (20).

As previously stated, SIR is one method allowed by EPA to monitor petroleum retail outlets for small leaks. SIR compares various data points over time to calculate a statistical trend for tank inventory; the accepted methodology is set forth in an EPA publication "Statistical Inventory Reconciliation Methods." SIR has proven over the years to be one of the more reliable methods for monitoring product levels, i.e., it has a lower incidence of false alarms. UST are by standard 10,000 gallons, but they vary in size up to five percent. While a negative balance is evidence of a leaky tank, it can also be caused by faulty dispenser calibration, faulty ATGs, ATG probe not properly positioned, and tilted tanks. Positive balances can be caused by faulty dispensed calibration, faulty ATGs, or probes not being property positioned.

Several companies have set up large computer systems designed specifically to perform SIR calculations, Simmons Corporation in Texas and Warren Rogers Associates in Road Island being examples. In a preferred embodiment of the present disclosure, information from the product level database (24) is transferred to a SIR computer facility (24) where the SIR calculations are performed. In an alternate embodiment, SIR calculations are performed by programming in the server (14). SIR calculation formulas will be established within the guidelines set forth by above mentioned EPA publication.

Figure 3:
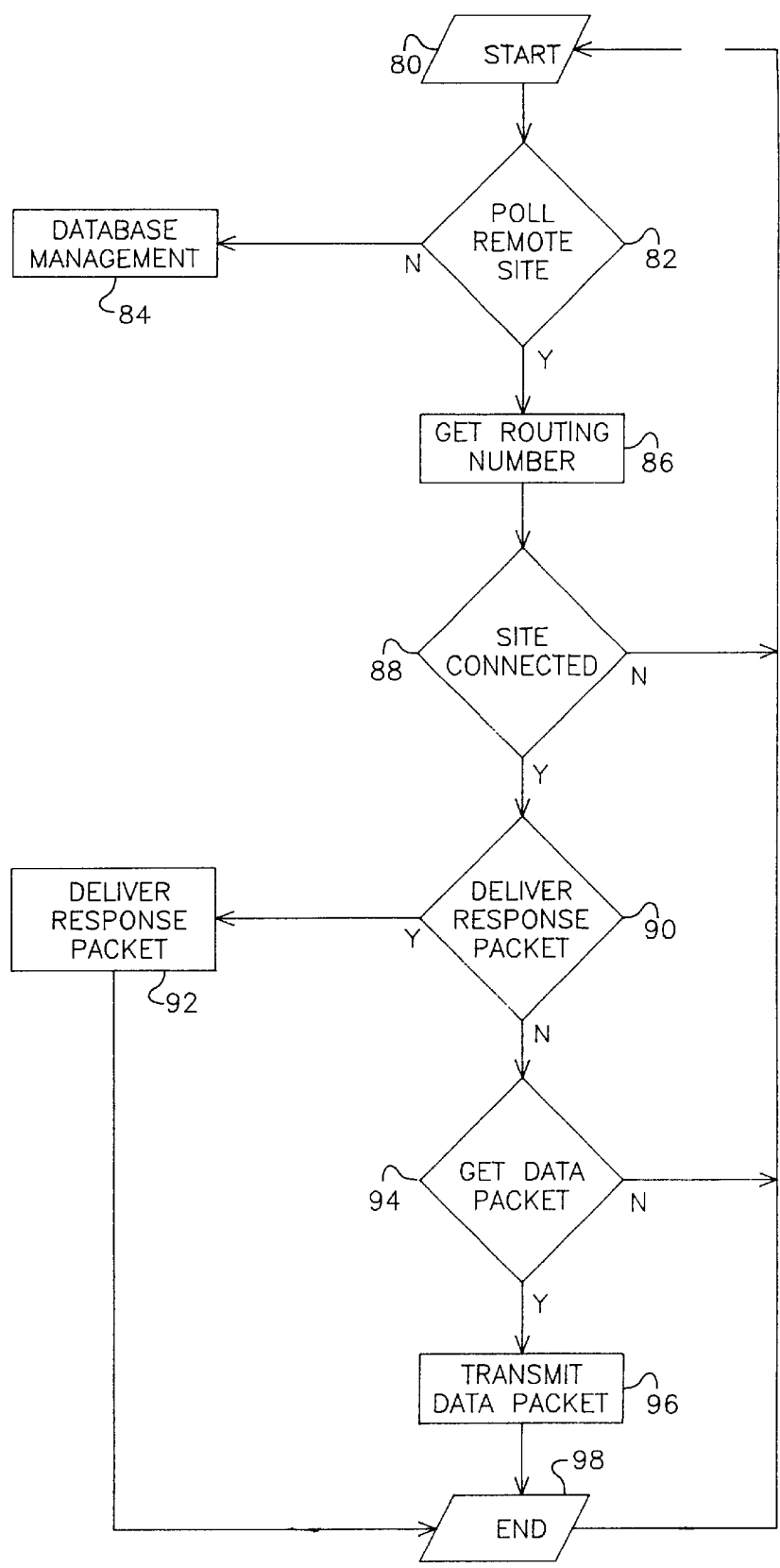
FIG. 3 is a block diagram illustrating major software blocks of the present invention for polling the remote sites and gathering the data packets.

Referring now to FIG. 3, there is shown a non-limiting flowcart of block diagrams of the programming routines for polling a remote site, delivering a response packet, or gathering a data packet. The program starts at start-initiation software block (80). At decision block (82) the program queries the immediate task at hand, is it to poll a remote site or does the task involve database management? Database management is through software block (84), later discussed in FIG. 4. When the program is polling a remote site, it proceeds to software block (86) where the program gets the routing number from the routing number database (22). Decision block (88) determines when the remote site is connected. If it does not connect within a preset time limit, the routine time-outs for a retry through start block (80). If it connects, decision block (90) determines if the task at hand is to deliver a response packet or to gather a data packet. Delivery of a response packet is through routine block (92) where the response packet is transmitted to the RLM at the site and may include any number of flags including a leak alert, remaining inventory, billing information, or any other information relevant to that site. The response packet is a digital data stream tagged for the RLM location. The system is programmed to obtain the data packets at preset times, typically once per day. The data packet, which is obtained by block (94) and transmitted by block (96), includes information from the Tank.Data.File, previously discussed. The program ends at block (98) and thereafter loops back to the start block (80).

Figure 4:
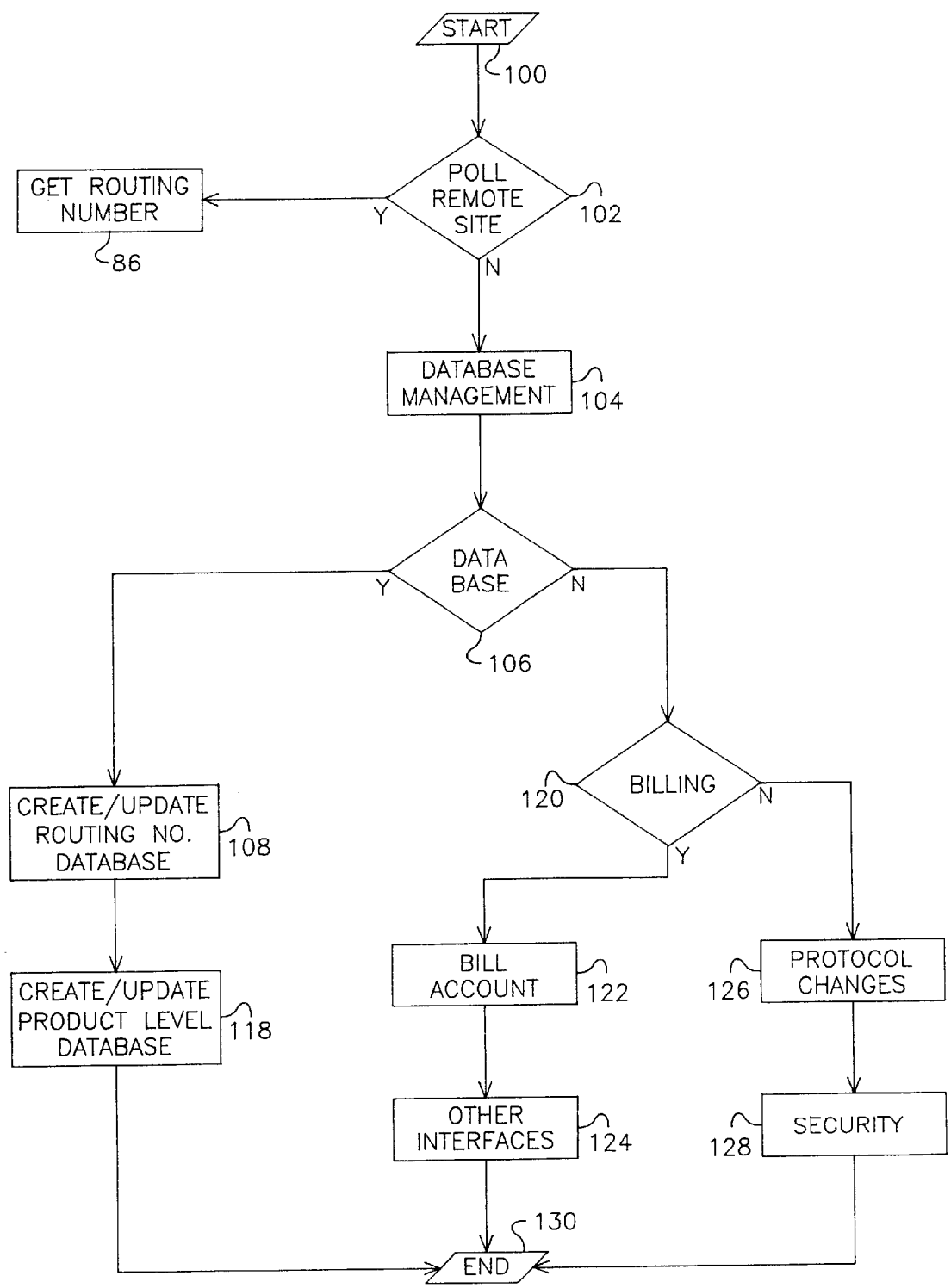
FIG. 4 is a block diagram illustrating major software blocks of the present invention for database management.

Referring now to FIG. 4, there is shown a block diagram of a flowchart illustrating database maintenance software functions performed by the server (14). Starting from the initiation software block (100), the program proceeds to decision block (102) where it queries the task to be performed. As discussed with FIG. 3, the task may be to poll a remote fueling location which is handled through the routines of software block (86), or the function may be database management where it proceeds to software block (104). Database management data may be coming from operator input (18) as seen in FIG. 1, or the data may be coming from the SIR facility. At decision block (106) the program further determines if the task at hand is to manage the databases, or if the task involves another function such as billing. If the task is database management, the program proceeds to block (108) for the creation-updating of the routing number database (22). This database contains the electronic addresses for the remote fueling sites in the network. Block (118) contains routines for creating/updating product level information for each remote site. When the task does not involve database management, the program proceeds to decision block (120) where the program determines if this is a billing task. If so, the program proceeds to block (122) where an account can be adjusted. While not an essential feature of the present disclosure, the billing subroutine provides a method for tracking and billing clients for the service provided. This could provide a method for financing the network. When a billing matter is not involved from decision block (120) the program proceeds to block (126) where system control protocol changes can be made and then to block (128) where security matters such as coding and decoding of copy is handled. The program eventually reaches the end block (130) whereby the program loops back and returns to the start block (100) for another cycle.

The present invention may, of coarse, be carried out in ways other than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An information collection system for gathering product level profile information from a plurality of different, spaced apart fueling locations networked together to a server through the Internet, comprising:
   (a) dispenser means for delivering a variable volumetric flow of product into a vehicle tank, functionally connected to tank means for supplying product to be dispensed;
   (b) measuring means, located in said tank means, for measuring product level in said tank means;
   (c) POS means functionally connected to said dispenser means, for initiating commands to said dispenser means and receiving responses from said dispenser means;
   (d) monitoring means, functionally connected to a data line between said dispenser means and said POS means for monitoring, collecting, and storing information on amount of fuel dispensed from said dispenser means, and further functionally connected to said measuring means for collecting and storing product level information for said tank means;
   (e) server means, functionally connected to said monitoring means, for maintaining a first database containing routing numbers for said spaced apart POS locations and a second database containing product level profile information for said spaced apart POS locations; and
   (f) network means, operatively connecting said monitoring means and said server means, for transmitting information between the two.

2. An information collection system as recited in claim 1, wherein said network means is the Internet.

3. An information collection system as recited in claim 1, wherein said network means is a cable based system.

4. An information collection system as recited in claim 1, further including fuel pump control means electrically connecting said POS means and said dispenser means, for interfacing the two.

5. An information collection system as recited in claim 4, wherein said fuel pump control means includes a nonvolatile read-and-write circuit for storing operating code and a static read-and write circuit for storing response data.

6. An information collection system as recited in claim 1, wherein said monitoring means includes an electronic communication translator means, connected to said data wire, for converting the data stream into a computer logic data stream having corresponding data fields including information on fuel dispensed.

7. An information collection system as recited in claim 6, wherein said monitoring means includes a microprocessor means, connected to said electronic translator means, for receiving said computer logic data stream.

8. An information collection system as recited in claim 7, wherein said monitoring means includes a programmable data field selector means, connected to said microprocessor means, for causing said microprocessor to select certain data fields and to discard all others.

9. An information collection system as recited in claim 7, wherein said monitoring system includes a memory means, coupled to said microprocessor means, for receiving and storing information on fuel dispensed.

10. An information collection system as recited in claim 6, wherein said communication translator means includes an opto-coupler means with a light emitting diode and transistor for converting said data stream into said computer logic data stream.

11. An information collection system as recited in claim 6, wherein said communication translator means includes a comparator means for converting said data stream into said computer logic data stream.

12. An information collection system for gathering product level profile information from a plurality of different, spaced apart fueling locations networked together to a server through the Internet, comprising:
   (a) dispenser means for delivering a variable volumetric flow of product into a vehicle tank, functionally connected to tank means for providing product to be dispensed;
   (b) measuring means, located in said tank means, for measuring product in said tank means;
   (c) POS means, functionally connected to said dispenser means, for initiating commands to said dispenser means and for receiving responses from said dispenser means;
   (d) fuel pump control means, operatively connected between said dispenser means and said POS means, for interfacing the two;
   (e) monitoring means, functionally connected to a data line between said dispenser means and said POS means, for monitoring, collecting, and sorting information on the amount of fuel dispensed from said dispenser means, and further functionally connected to said measuring means for collecting and storing product level information for said tank means;
   (f) server means, functionally connected to said monitoring means, for maintaining a first database containing routing numbers for said spaced apart fueling locations and a second database containing product level profile information for said spaced apart fueling locations; and
   (g) network means, operatively connecting said monitoring means and said server means, for transmitting information between the two.

13. An information collection system as defined in claim 12, wherein said network means is the Internet.

14. An information collection system as defined in claim 12, wherein said monitoring means includes an electronic communication translator means, connected to said data line, for converting the data stream into a computer logic data stream having corresponding data fields including information on the amount of fuel dispensed.

15. An information collection system as defined in claim 14, wherein said communication translator means includes an opto-coupler with light emitting diode and transistor for converting said data stream into said computer logic data signals.

16. An information collection system as defined in claim 14, wherein said communication translator means includes a comparator for converting said data stream into said computer logic data signals.

17. A method for gathering product level profile information from different, spaced apart fueling locations networked together with a server means, comprising the steps of:
   (a) monitoring fuel dispensers with a RLM at said fueling locations to determine the amount of fuel dispensed and storing the amount of fuel dispensed data in a storage device;
   (b) measuring product level in the USTs containing fuel to be dispensed with an ATG;
   (c) monitoring said ATG in said USTs by said RLM at said fueling locations to determine existing fuel levels and storing fuel level data in the storage device;

(d) monitoring fuel additions to said USTs by said RLM at said fueling locations to determine amount of fuel added to said USTs and storing fuel added data in the storage device;

(e) linking said fuel dispensed data, said fuel level data, and fuel added data with a fueling location identifier to form a data packet;

(f) connecting said RLM to a server through the Internet, where said server maintains a first database of routing numbers for said spaced apart fueling locations and a second database of product level profile information at individual fueling locations;

(g) causing said server to poll said RLM from said routing number maintained in said routing number database; and (h) transmitting to said server said data packet where said server updates said product level profile database with transmitted data.

18. A method as recited in claim 17, further comprising the step of transmitting from said server a response packet to said RLM.

19. A method as recited in claim 18, wherein said response packet includes a leak alert message.

20. A method as recited in claim 18, wherein said response packet includes product inventory information.

21. A method as recited in claim 17, further comprising the step of configuring the communication protocol between said POS and said dispenser by a configuration means for translating said communication protocol into a format readable between the two.

22. A method as recited in claim 17, further comprising the step of transmitting to a SIR computing facility information from said product level profile database for SIR analysis.

23. An information gathering system for collecting, sorting, and storing product level profile information from a plurality of different, spaced apart fueling locations networked together, where each fueling location in the network may or may not include a different type dispenser from any other one or more of the other fueling locations, comprising:

(a) dispenser means for delivering a variable volumetric flow of product into a vehicle tank, functionally connected to tank means for supplying product to be dispensed;

(b) measuring means, located in said tank means, for measuring product level in said tank means;

(c) input means for recording amount of product added to said tank means;

(d) POS means functionally connected to said dispenser means, for initiating commands to said dispenser means and receiving responses from said dispenser means;

(e) fuel pump control means, operatively connected between said dispenser means and said POS means, for interfacing the two;

(f) configuration means, connected between said dispenser means and said fuel pump control means, for configuring the communication protocol of the two; (g) monitoring means, functionally connected to a data line between said dispenser means and said POS means for monitoring, collecting, and storing information on amount of fuel dispensed from said dispenser means, and further functionally connected to said measuring means for collecting and storing product level information for said tank means;

(h) server means, functionally connected to said monitoring means, for maintaining a first database containing routing numbers for said spaced apart fueling locations and a second database containing product level profile information for said spaced apart fueling locations; and (i) network means, operatively connecting said monitoring means to said server means, for transmitting information between the two.

24. An information collection system as recited in claim 1, wherein said network means is a satellite based system.

* * * * *